Feb. 16, 1937. A. Y. DODGE ET AL 2,071,297
BRAKE
Filed May 21, 1931 2 Sheets-Sheet 1

INVENTORS
Adiel Y. Dodge
Montgomery W. McConkey
BY
H. O. Clayton
ATTORNEY

Patented Feb. 16, 1937

2,071,297

UNITED STATES PATENT OFFICE 2,071,297

BRAKE

Adiel Y. Dodge and Montgomery W. McConkey, South Bend, Ind., assignors to Bendix Brake Company, South Bend, Ind., a corporation of Illinois Application May 21, 1931, Serial No. 539,087

7 Claims. (Cl. 188—152)

This invention relates to brakes, and is illustrated as embodied in a system of hydraulic brakes for an automobile. An object of the invention is to provide a system of this general character which will adjust itself automatically as the brakes wear, maintaining a constant clearance for the brake shoes or their equivalents, and at the same time replenish itself with operating fluid so that there will be no loss of pedal.

A further object of the invention is to provide a brake structure which will operate uniformly under all conditions of service, particularly during successive applications of the brake. With such a mode of operation, often necessary in mountainous country, the frictional heat developed causes an appreciable expansion of the brake parts, particularly the brake drum; however, the aforementioned slack adjusting mechanism continues to function as the drum expands, and with the subsequent cooling of the drum there results a seizure of the drum and brake shoes causing the very undesirable "dragging" of the brake. It is, therefore, an object of the invention to so design the cooperating friction parts of the brake as to obviate this effect and maintain a uniform braking expansion regardless of the temperature of the brake parts.

Various features of novelty relate to the general arrangement of the parts of the system to attain the desired result, to the construction of the brake giving the automatic adjustment to compensate for wear, to the fluid power operating device which maintains a light pressure in the fluid connections and which preferably automatically replenishes itself with fluid, and to various novel and desirable details, all of which will be apparent from the following description of the illustrative embodiments shown in the accompanying drawings, in which.

Figure 1:
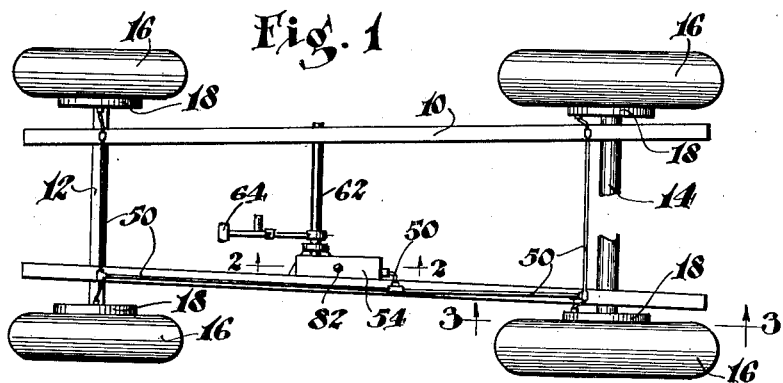
Figure 1 is a diagrammatic view of an automobile chassis, illustrating the invention as applied.

The chassis illustrated in Figure 1 includes a frame 10, supported by the usual springs on front and rear axles 12 and 14 carried by the usual road wheels 16 having brake drums 18.

Each brake preferably includes a support such as a backing plate 20, mounted on the rear axle 14 or on the usual front knuckle swiveled to the front axle 12, and on which is mounted the friction means of the brake, for example two shoes 22 and 24 anchored on pivots 26 carried by the backing plate. The shoes are applied, against the resistance of a return spring 28, by fluid operated means such as a pair of opposed pistons 30 arranged in a cylinder 32 and pivoted to the shoes.

Figures 4, 5:
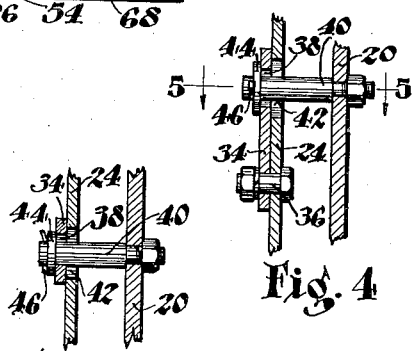
Figure 4 is a partial section on the line 4—4 of Figure 3, lengthwise through one of the automatically-operated friction stops.
Figure 5 is a partial section on the line 5—5 of Figure 4, crosswise through the automatic stop.

The idle or released positions of shoes 22 and 24, or their equivalents, are determined by novel automatic means, one form of which is shown in Figures 4 and 5. In this arrangement, a stop plate 34 is frictionally gripped at one end to the web of each shoe by means such as a bolt 36. The upper end of each stop 34 has a slot 38 encircling a post 40 carried by the backing plate and which passes through a large opening 42 in the shoe web. Post 40 may, if desired, have means such as a washer 44 held by a cotter pin 46 and serving as a steady rest for the shoe.

Slot 38 is wider than the diameter of post 40 by an amount equal to the desired clearance of the shoe. Thus when the shoe wears so that there would otherwise be an increase in this clearance, posts 40 act when the brake is applied automatically to shift stops 34 against the frictional resistance of bolts 36, so that the desired predetermined clearance is nevertheless maintained. It will be noted, however, that this results in increasing the distance between pistons 30 in released position, so that there would be a loss of pedal travel unless additional fluid is supplied in the fluid connections to compensate therefor.

Figure 3:
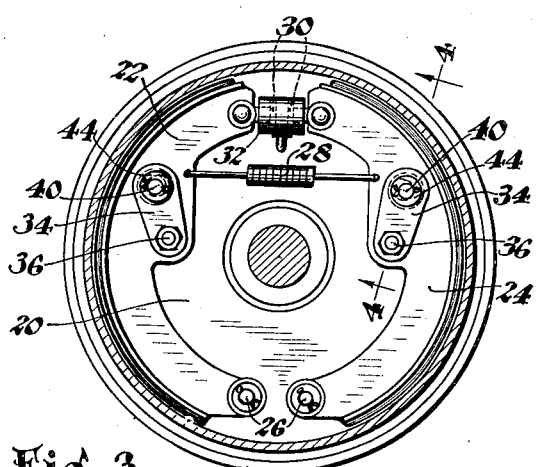
Figure 3 is a vertical section through one brake on the line 3—3 of Figure 1, just inside the head of the brake drum, showing the brake shoes in side elevation.
Figure 6:
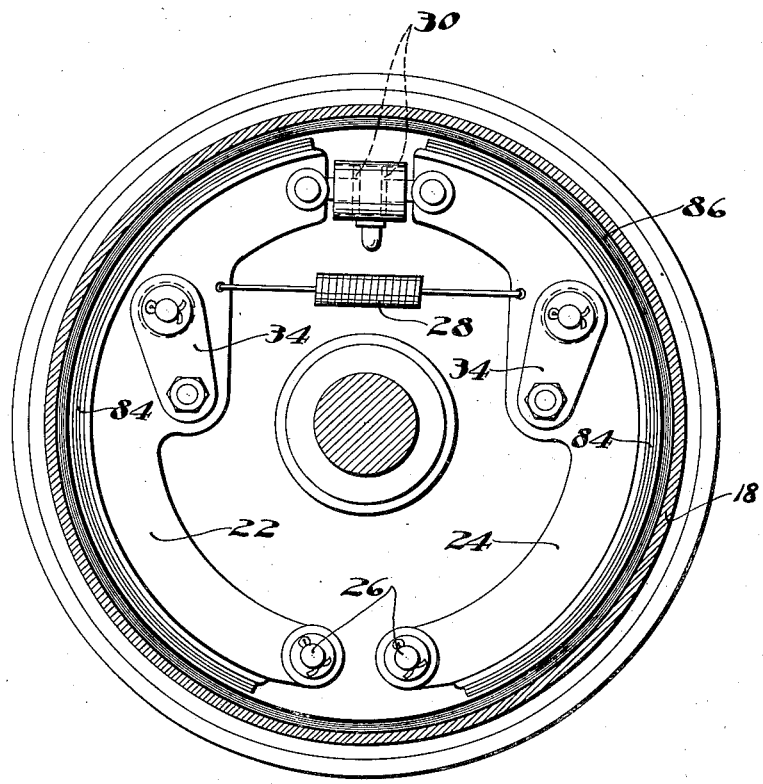
Figure 6 is a section similar to Figure 3, showing a modified form of brake structure.

There is disclosed in Figure 6 a modified form of brake mechanism similar in all principal respects to that just described and disclosed in Figure 3. This structure, however, is particularly designed to maintain a constant lining clearance, irrespective of the temperature of the parts developed during the braking operation.

After frequent successive applications of the brake or after a prolonged application as in braking during the descent of a mountain, the heat developed is quite appreciable. The brake drum automatically expands as it is heated, increasing its inner diameter, and upon release of the brake shoes from their contact with the heated drum the aforementioned stop structure functions to determine the clearance between the lining on the brake shoe and the drum; however, with cooling of the drum and its consequent shrinkage, this clearance is appreciably reduced and may result in the dragging of the brake shoes upon the drum.

In order to obviate this effect, there is suggested the provision of brake shoes 22 and 24 having friction coverings 84 (Figure 6) and a brake drum preferably lined with friction material 86, the materials of said shoes, friction covering for the shoes, drum and friction covering for the drum being so selected, particularly as to their isotropic properties and coefficient of cubical expansion, that all parts relatively expand and contract when heated and cooled, respectively, in such fashion as to maintain a constant clearance between the lining 86 and the shoe covering 84. It is to be understood that the more the brake liners provide heat insulation for the brake drum and the brake shoes respectively, the smaller will be the expansion of said drum and shoes respectively due to the heat caused by the application of the brakes. The effect of the heat insulation provided may be varied by securing the liner having the greater insulating qualities to the drum or to the shoes as desired. The insulating qualities of the brake liners may be varied by changing the thickness of the liner.

By varying either of these factors we may thus vary the amount of heat conducted to the drum or to the shoes and therefore may vary the expansion of the shoes or of the drum. Moreover as stated above, we may vary the material of the shoes, of the drum, or of the liners so that the coefficient of expansion due to heat will vary.

By control of one or more of these factors, we can control the expansion of the shoes and the drum. Thus we may secure equal expansion of the shoes and the drum. With such a structure the heating and cooling of the brake parts have no effect upon the maintenance of the desired lining clearance.

The material of the brake shoes 22 and 24, their friction coverings 84, the brake drum 18, and the lining material 86 where the drum is lined, should be varied in order to produce the desired results, dependent upon other variables which may be present. The relative expansion of the drum and shoes is affected in most cases, not only by the coefficient of expansion of the material of the shoes and drum, the thickness and thermal conductivity of the linings, and the thickness of the drum and shoes, but also by the area of the cooling surface of the drum, and the possibility of the flow of air through the drum with its consequent cooling of the brake shoes. The relative expansion is also affected by the weight of a particular car and the size of the brakes. It is necessary therefore for each particular type of car to select substantially suitable materials and then through tests to vary the thickness of one or more elements in order to design the brakes for that model.

We have found that for one car weighing approximately 5,000 pounds, equipped with brakes on four wheels, each brake being approximately 14″ in diameter and provided with cast aluminum shoes having Hycoe brake lining and a steel drum, by the proper choice of the thickness of the brake lining and the drum, the brakes could be so constructed that the shoes expanded for all temperatures substantially equally with the drum. Thus the clearance between the shoes and the drum when the brake was relatively cool (i. e. having a temperature in the neighborhood of 100° F.) was substantially the same as the clearance when the brake had become moderately heated through brake applications to a temperature of 200° F. and substantially the same as the clearance when the brake had become quite hot through severe repeated brake applications, to a temperature of approximately 400° F.

As stated above, the shoes 22 and 24 may have friction lining of any suitable material and as an example thereof, the shoes could be of aluminum, lined with molded brake lining. The brake drum and its lining could also be of any suitable material and as an example thereof, the brake drum could be of steel and having a lining of cast iron. Moreover, though we have stated that the brake drum should preferably be lined, yet a brake drum having no separate lining will, in certain cases, also be satisfactory. In an extreme case, a brake drum might be made of invar steel, which, having such a low coefficient of expansion, would expand comparatively little with changes of temperature and the brake shoes, even though insulated by the brake lining, could be designed to expand equally with the brake drum.

The materials which are suggested above, and which, it is repeated, are only listed by way of example, have characteristics substantially as follows: Certain steels have a conductivity factor expresed in B. t. u. per 1° F. difference in temperature per one inch thickness per square inch per second of approximately .0005. Certain aluminums have a similar factor of .00203. Certain cast irons have a similar factor of .0008. Hycoe moulded brake lining number 451 has a conductivity factor of approximately .00000322. Steel has a coefficient of expansion per unit length per 1° F. of .00000636. Aluminum has a similar factor of .00001234. Cast iron has a similar factor of .00000556.

To summarize, the coefficient of expansion of aluminum is about twice that of steel and about two and one-half times that of cast iron. In the construction suggested by way of example, this variation would cause the shoes to expand faster than the drum. The cooling effect of the outside circulating air on the drum is very much greater than that of the air in the drum on the shoes. Therefore, the drum is cooled better than the shoes and this also causes the shoes to expand more than the drum. Similarly, the fact that the cooling area of the drum is larger than the cooling area of the shoes, causes the shoes to expand more than the drum. However, the heat is conducted to the drum three or four times faster than to the shoes due to the poor heat conduction of the molded brake lining suggested for use on the shoes as compared with the heat conduction of the cast iron liner of the drum, and this tends to cause the drum to expand more than the shoes.

Therefore, it is only necessary to select a drum with a sufficient cooling surface and a brake lining of the correct thickness and conductivity so that the aluminum brake shoes will become only approximately half as hot as does the periphery of the brake drum in order to secure a balance of factors and cause the shoes to expand substantially equally with the drum.

Cylinders 32 are all connected by flexible connections or conduits 50 with a master cylinder 52, forming part of a fluid power operating device and preferably arranged in a reservoir or housing 54 secured to the chassis frame 10. Cylinder 52 contains an operating piston 56 with a connecting rod 58 by which it is operated from an arm 60 on a shaft 62 operatively connected to the service brake pedal 64. Thus depression of pedal 64 operates the piston 56 to apply force to oil or other fluid in conduits 50 to apply the brakes.

In order to replenish the fluid automatically, for the purpose explained above, reservoir 54 is filled with oil or the like to a level 66 above cylinder 52, and which is permitted ingress to cylinder 52 and connections 50, when under sufficient pressure, through a ball check valve 68 held by a spring 70.

Air is kept compressed in reservoir 54 above the level 66 by a pump operatively connected to the piston 56 and shown as including a piston 72 connected to arm 60 by a connecting rod 74, the piston being arranged in a cylinder 76 having a air intake 78 provided with a suitable check valve, and having an air exhaust 80 inside reservoir 54 and also provided with a suitable check valve.

When the brakes are applied, piston 72 is moved to the right to suck air through the intake 78, while when the brakes are released the usual return spring 65 on pedal 64 (not shown) moves piston 72 to the left to force this air through exhaust 80 into the reservoir 54. A suitable pressure relief valve 82, of any desired construction, holds the pressure of the air in reservoir 54 to a predetermined maximum which, of course, is necessarily low enough to be overcome by the pedal return spring, but high enough to overcome spring 70 and force additional fluid into the system to replenish that lost by leakage and to add enough to compensate for the gradual separation of the pistons 30 as the brakes wear. Thus the fluid in connections 50 is always under a light pressure insufficient to overcome the springs 28, but sufficient to insure that pistons 30 are at all times urged yieldingly apart against shoes 22 and 24.

It will be understood that while the illustrated embodiments of the invention are described as shown, a considerable latitude is to be permitted in construction within the range of the appended claims.

Figure 2:
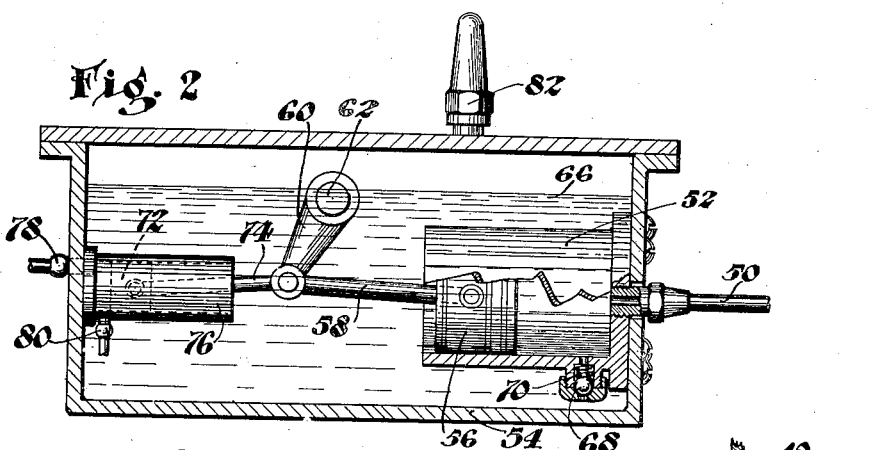
Figure 2 is a section on the line 2—2 of Figure 1, showing the fluid power operating device in longitudinal vertical section.

This application constitutes a continuation in part of our application No. 350,501, filed March 28, 1929. The master cylinder shown in Figure 2 is claimed in divisional application No. 119,714, filed January 9, 1937.

We claim:

1. A brake structure comprising, in combination, a rotor member, a stator member adapted to be moved into engagement with said rotor member, friction material secured to the face of said stator member and friction material secured to the face of said rotor member, said members and friction material thereon being isotropic in nature and having such cubical coefficients of expansion as to maintain a predetermined position relationship at all temperatures of the parts incurred during the normal operation of the brake.

2. A brake structure comprising, in combination, a rotor member, a stator member adapted to be moved into engagement with said rotor member, friction material secured to the face of said stator member, said members and friction material thereon being isotropic in nature and having such cubical coefficients of expansion as to maintain a predetermined position relationship at all temperatures of the parts incurred during the normal operation of the brake.

3. A brake comprising relatively movable rotor and stator members, each of said members being provided with friction lining material, automatically actuated stops for said stator members operable to determine the clearance between said rotor and stator members, said members and lining material thereon having such cubical coefficients of expansion as to insure a predetermined clearance between said rotor and stator members under all thermal conditions thereof.

4. A brake comprising relatively movable rotor and stator members, each of said members being provided with friction lining material, automatically actuated stops for said stator members operable to determine the clearance between said rotor and stator members, and means in addition to said lining material for maintaining a predetermined clearance between said rotor and stator members under all thermal conditions thereof.

5. A brake structure comprising, in combination, a rotor member having a predetermined coefficient of expansion, and a stator member having a surface adapted to contact with a surface of said rotor member, and having a predetermined coefficient of expansion such that expansion changes due to temperature increases expand said surface of the stator member radially equally with radial expansion of said surface of the rotor member.

6. In combination in an automatically adjustable brake, a brake drum, a braking member for engagement with the drum, an automatic clearance adjusting mechanism for said engaging member in said drum, said brake being arranged to maintain the parts in such relation that the mechanism will not be operated to adjust for clearance due to drum heat expansion.

7. A brake comprising a drum, a friction device therein, and an automatic adjustment device, and said brake being arranged to maintain the parts in such relation that the mechanism will not be operated to adjust for expansion of the drum due to drum heat.

ADIEL Y. DODGE.
MONTGOMERY W. McCONKEY.